March 7, 1961 A. E. BISHOP 2,973,658
VARIABLE RATIO POWER STEERING GEAR
Filed June 27, 1958 3 Sheets-Sheet 1
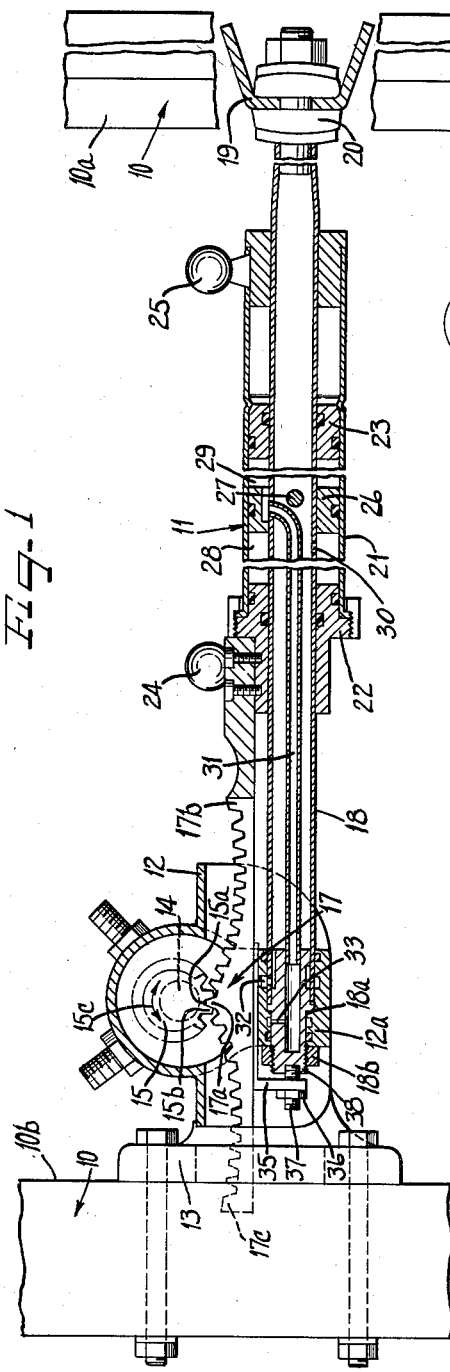
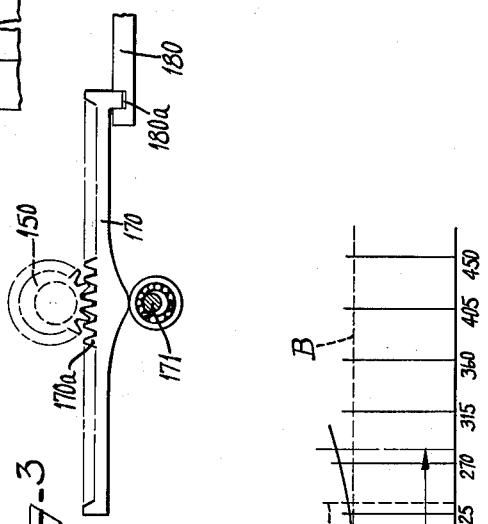
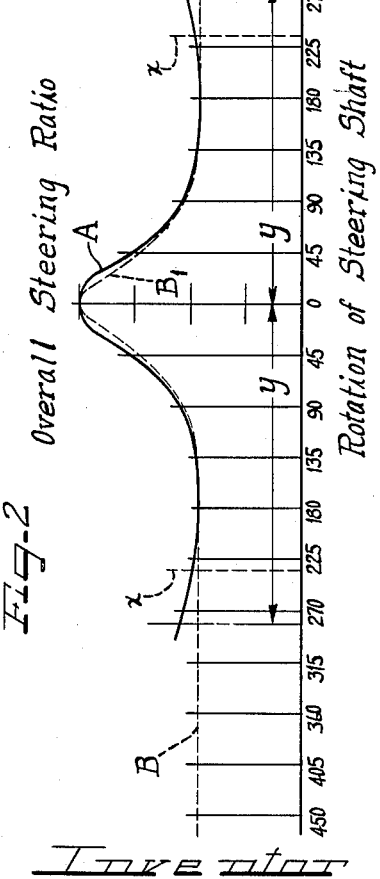
Inventor
Arthur E. Bishop March 7, 1961 A. E. BISHOP 2,973,658
VARIABLE RATIO POWER STEERING GEAR
Filed June 27, 1958

Inventor
Arthur E. Bishop

March 7, 1961  A. E. BISHOP  2,973,658
VARIABLE RATIO POWER STEERING GEAR
Filed June 27, 1958  3 Sheets-Sheet 3
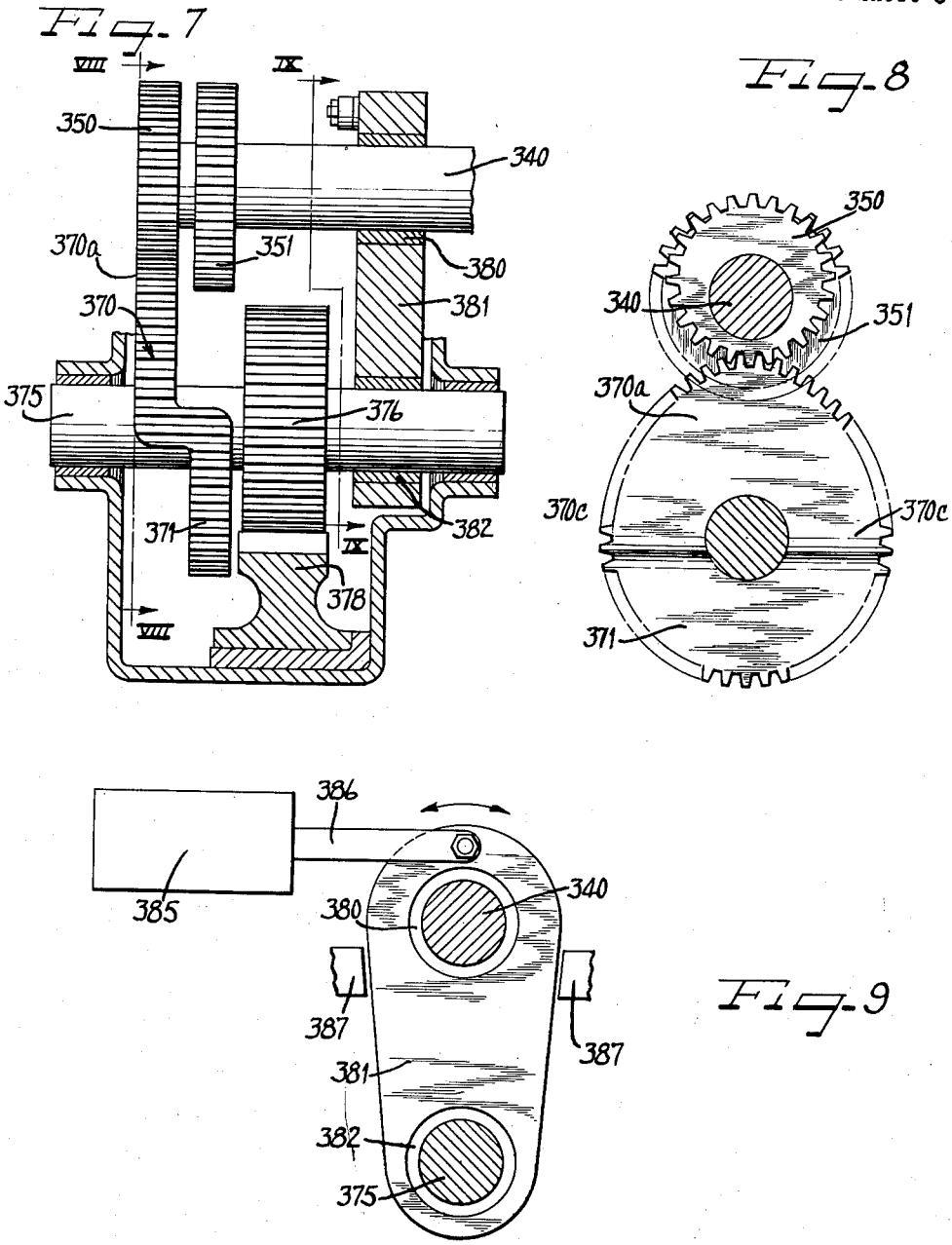
Inventor
Arthur E. Bishop
by
Attys United States Patent Office 2,973,658
Patented Mar. 7, 1961

2,973,658

VARIABLE RATIO POWER STEERING GEAR

Arthur E. Bishop, Bloomfield Township, Oakland County, Mich. (5516 Westwood Lane, Birmingham, Mich.)

Filed June 27, 1958, Ser. No. 745,007

17 Claims. (Cl. 74—388)

The present invention relates to steering apparatus for dirigible vehicle wheels and is, more particularly, concerned with the construction of a new and improved variable steering gear mechanism for automotive vehicles or the like. The steering apparatus of the present invention may be used in manual steering systems but, as will be more fully described below, finds particularly advantageous utility in power actuated steering systems.

The present application is a continuation-in-part of my copending application Serial Number 546,210, filed November 10, 1955. As has been pointed out in the above-mentioned copending application and in my earlier copending applications Serial Numbers 494,706 and 511,541, filed March 16, 1955, and May 27, 1955, respectively, now Patent Nos. 2,865,216 and 2,865,217, respectively, the utilization of power steering apparatus for conventional land borne motor vehicles has greatly increased in recent years. As a result, power steering is not only commonplace in automotive vehicles but it is being provided on even the least expensive American automobiles and is in general demand by the motoring public.

Although the provision of power assist, or boost, in vehicle steering systems has very substantially reduced the amount of steering effort necessary by the vehicle operator and has, accordingly, substantially reduced the physical effort necessary for the steering of a vehicle, especially in slow speed turns or parking, the heretofore commonly used manual steering gearing ratios have for the most part been retained in presently commercial power steering systems. While automotive experts have generally recognized the desire for low ratio vehicle steering, or in other words more direct steering, in which the steering wheel need be turned fewer revolutions to cause a corresponding turn in the dirigible wheels of the vehicle from one extreme to the other, such direct steering has been utilized in only one commercially manufactured American vehicle. The main reason for refusal to incorporate more direct steering in automobiles is that in known prior art steering systems, the use of direct steering causes driver fatigue at highway speeds on generally straight roads. This is true since the more direct steering ratios require only a very small degree of steering wheel turn to provide a substantial degree of vehicle turn. Accordingly, at high speeds, continual wheel jockeying becomes necessary to keep the vehicle on the road and any sub-pulls or lurches at the steering wheel may cause the vehicle to leave the road unintentionally. This possibility of inadvertent over-steering is, of course, rendered even more acute where power steering is employed since small physical effort is required on the part of the vehicle operator to produce large vehicle deflections capable of putting the vehicle out of control.

The steering apparatus of the present invention provides the extremely desirable benefits of low ratio or direct steering under certain circumstances, by providing such steering in the ranges of steering wheel movement ordinarily used in parking or traversing low speed turns. On the other hand, the steering system of the present invention provides relatively high ratio steering in the straight-ahead or ordinary highway driving condition. This is accomplished through the provision of a variable ratio steering system in which the steering ratio changes from an initial high value, such as for example in excess of 20 to 1 in the straight-ahead driving condition to a substantially lower ratio of for example, approximately 8 or 10 to 1 in the range of steering wheel movement used in negotiating parking or other short radius turns. This is accomplished in the present invention through the utilization of a cam or nonround gearing, for example, in one of the embodiments shown, a rack and pinion drive connection between the steering wheel shaft and the dirigible wheels. In the straight-ahead condition, the cam gear secured to the steering shaft has a reduced radius portion which co-operates with what may be termed a humped rack portion thereby providing a maximum gear reduction or ratio in the straight-ahead condition. As the steering wheel is rotated a larger radius portion of the cam gear thereon engages the reciprocating rack which is decreasingly humped as it moves out of its neutral or straight-ahead position, thereby providing a substantially lower gear reduction or ratio between the steering wheel shaft and the vehicle wheels.

In accordance with the principles of the present invention, power boost is applied to the reciprocating rack so that the power applied by the power motor is applied directly to the linkage without variation independently of the degree of wheel turn. At the same time, valve control for the power motor is associated with the steering wheel shaft. In one embodiment of the present invention, the valve control is directly associated with the steering wheel shaft and hence is properly related to the feel at the steering shaft in spite of the variable ratio between the valve and the vehicle wheels. In another embodiment illustrated, the valve control for the motor is actuated by transverse movement of the steering wheel shaft in response to steering torque at the steering shaft. In further accordance with the principles of the present invention, a reciprocable spool valve of either the continuous or non-continuous flow type may be utilized to operate a power motor for aiding the manual steering of the dirigible wheels.

In accordance with the principles of the present invention, the steering wheel shaft is provided with a variable ratio output gear which is associated with, in a first embodiment, a reciprocating rack member having a variable contour for co-operation with the variable output gear of the steering shaft. In the first form of the invention illustrated, a single variable ratio output gear is provided for co-operation with an output rack and arranged to permit slightly over one turn of the steering wheel shaft from one extreme of steering movement to the other extreme without appreciable repetition of the variable ratio cycle. In a second embodiment illustrated, a compound output gear is provided for the steering shaft and arranged such that a variable ratio portion of the gear operates with a contoured reciprocating rack through a portion of the reciprocation of the rack while a second, constant diameter, constant ratio portion of compound gear co-operates with a straight rack portion during steering movements in excess of one-half turn of the steering shaft away from the straight-ahead condition. In a third embodiment illustrated, a compound variable ratio steering output gear is provided in co-operation with a compound rotating intermediate gear which in turn drives a constant ratio output gear co-operating with a reciprocating rack. In this third embodiment the steering gear ratio may be modified over a greater range than permitted where the steering shaft output gear is directly associated with the output rack.

Accordingly, it is an object of the present invention to provide a new and improved variable ratio steering apparatus for vehicles or the like.

Another object of the present invention is to provide a simple, inexpensive, vehicle steering apparatus providing a high ratio, relatively indirect, steering in the vehicle-straight-ahead condition and a substantially lower ratio for more direct steering as the vehicle leaves the straight-ahead condition.

Yet a further object of the present invention is to provide an improved vehicle steering system in which the steering wheel need turn only slightly more than one turn in order to provide movement of the vehicle wheels from one extreme position to the other extreme.

Still a further object of the present invention is to provide a novel and substantially improved variable ratio power steering system in which a reciprocating output rack may be inexpensively employed.

A feature of the invention resides in the utilization of a cam gear steering wheel shaft-to-vehicle wheel connection.

Another feature of the invention resides in the utilization of a variable ratio mechanism between the rotatable steering shaft and the reciprocating wheel actuating member characterized by the provision of a small mechanical advantage connection between the shaft and said member when the said member is in its neutral or vehicle-straight-ahead condition and a substantially greater mechanical advantage connection when said member is in positions only slightly removed from said neutral condition.

Another feature of the invention resides in the provision of a novel variable ratio steering system in which an extremely sharp vehicle turn may be made without requiring a complete turn of the steering wheel.

Still a further feature of the present invention is the provision of a novel compound variable ratio gearing mechanism whereby a variable ratio may be transmitted from a rotating steering shaft to a reciprocating output member directly without limiting total revolutions of the steering shaft.

Still other and further objects and features of the present invention will at once become apparent to those skilled in the art from a consideration of the attached drawings wherein several preferred forms of the invention are shown by way of illustration only, and wherein:

Figure 1 is an elevational view of one form of the steering apparatus of the present invention shown partially broken away and in cross-section to emphasize internal components;

Figure 2 is a graph illustrating variation in vehicle steering ratio provided by the system of the present invention;

Figure 3 is a modified form of the steering structure illustrated in Figure 1 illustrated diagrammatically;

Figure 7 is a cross-sectional side elevational view of still a further modified form of the present invention;

Figure 8 is a view in cross-section taken along the line VIII—VIII of Figure 7; and Figure 9 is an end elevational view in cross-section taken along the line IX—IX of Figure 7.

As shown on the drawings:

Figure 4:
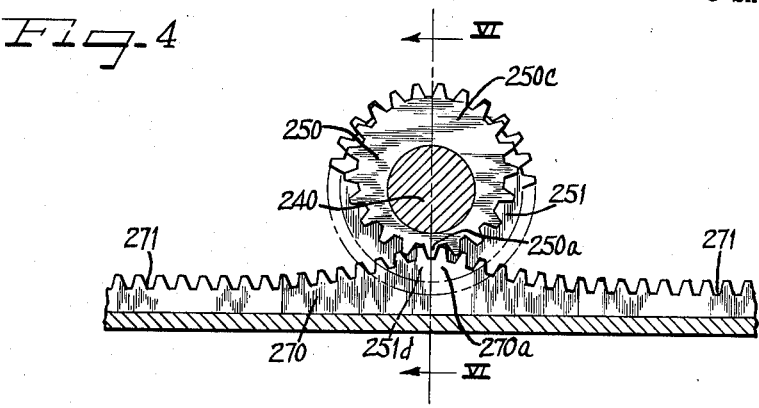
Figure 4 is an elevational view of a further modified form of the present invention as shown in end elevation.

As may be seen from a consideration of Figure 1, a vehicle frame 10 having longitudinally extending frame side rails 10a and 10b is provided with a transversely mounted power steering apparatus generally indicated at 11. As shown, the apparatus 11 comprises a housing 12 secured by means of a flange 13 to the longitudinal frame side member 10b. The housing 12 encloses the steering wheel shaft 14, an eccentric or cam gear 15, a control valve, and provides for passage therethrough of rack 17. A transversely extending brace or support rod 18, having a smooth outer cylindrical surface, is secured to the longitudinally extending frame side rail 10a by means of a downwardly depending bracket 19 and rubber grommet 20. The support rod 18 is likewise rigidly secured to the longitudinally extending frame side rail 10b by abutment 18a and a securing nut 18b which co-operate with the portion 12a of the housing 12 to fixedly secure the support 18 against movement along its longitudinal axis.

In the embodiment shown in Figure 1, the rack 17 is fixedly secured to a power cylinder member 21 which is slidably carried on rod 18 by cylinder heads 22 and 23 and which in turn carries ball studs 24 and 25 for connection to dirigible vehicle wheels through conventional tie rods, not shown. The piston 26 is secured to the support rod 18 by means of a pin 27, or other equivalent thereof, and accordingly the application of fluid under pressure to the chamber 28 will cause movement of the studs 24 and 25 toward the left as viewed in Figure 1 and the application of fluid pressure to chamber 29 will cause a movement of the studs toward the right as viewed in that figure. Hydraulic fluid under pressure is introduced into the chamber 28 via aperture 30 and into chamber 29 via conduit 31. The aperture 30 is in fluid connection with the fluid port 32 in the housing 12 and the conduit 31 is in fluid connection with the port 33. The ports 32 and 33 are connected to the output of any conventional power steering control valve, for example, the valve illustrated and claimed in my copending application Serial Number 546,210, filed November 10, 1955, now Patent No. 2,865,339.

The rack 17 and gear 15 provide a variable ratio force transmission in the manner of positive acting cams. As may be seen, the minimum radius point 15a of the gear 15 cooperates with a point 17a, which may be termed a point of maximum projection, of the rack cam 17. In this position, the mechanical advantage or leverage of the system provides a maximum ratio, or in other words a ratio in which a maximum angular movement of the shaft 14 must be provided to cause an increment of movement of the cam 17. As the steering shaft 14 is rotated by the steering wheel, not shown, the cam gear 15 increases an effective radius as the cam rack 17 decreases in the amount of projection toward the gear. As a result, the ratio decreases until at a point of one-half turn of the steering wheel shaft 14, or 180° of movement thereof, a point of maximum radius 15b, with equivalent minimum ratio, is reached.

In actual practice, it is preferred that the gear 15 be provided with a maximum radius or minimum ratio portion extending through an arc of rather substantial nature, such as indicated at 15c and accordingly the steering wheel may be rotated beyond the 180° point for a substantial distance without causing a substantial increase in ratio. The above performance characteristics may be more clearly seen from a consideration of Figure 2 wherein the overall steering ratio of the vehicle is plotted against angular turn of the steering wheel shaft 14 away from a neutral or vehicle-straight-ahead condition. As may be seen in that figure from the solid line curve A, the vehicle steering system as a whole is preferably engineered to provide a high maximum ratio, or a maximum degree of steering insensitivity, in the straight-ahead driving condition approximating 20-to-1. This ratio is quite satisfactory for manual steering systems and comprises to ratio of turns of the steering wheel shaft 14 to turns of the individual dirigible wheel about its steering pivot axis. In the system herein shown, as the steering wheel rotates away from the neutral, straight-ahead condition, the ratio decreases substantially, and at a rapid rate adjacent the in-line position, to a minimum steering ratio of approximately 10-to-1 by the time the steering wheel shaft is rotated approximately one-quarter turn. In the condition of 10-to-1 ratio, it will be apparent that angular movement of the steering shaft 14 will result in an angular movement of the dirigible wheel at a rate twice that provided in the high ratio, straight-ahead driving condition.

As a result of the structure of the present invention, therefore, the vehicle driver is provided with a high ratio, relatively insensitive, or indirect, steering when the vehicle is in the straight-ahead position or negotiating relatively low degree turns such as ordinarily found on main highways. When the vehicle is being parked, or is negotiating slow speed turns such as street intersections or the like in which large angles of turn are required, the ratio of the steering is substantially decreased and such turns may be negotiated with only a relatively small amount of turn at the steering wheel. As a result, it is possible to construct a steering system in which the steering wheel provides complete steering control from one extreme position of turn to the other with approximately one and one-half turns of the steering wheel, a condition which compares extremely favorably with present day conventional systems which require approximately four, or more, turns of the steering wheel to provide the same degree of turn.

It is noted that in the arrangement illustrated, the major change in ratio occurs before a quarter turn of the steering wheel shaft has occurred. It has been found that accomplishing the major portion of the ratio change rapidly adjacent the vehicle straight-ahead condition provides a steering feel which is subjectively very satisfactory to most people. This places the portion of the curve A, in which the vehicle is being steered through sharp turns ordinarily encountered in parking, along a more or less constant ratio. As a result, ratio change at very slow speeds encountered in parking conditions is moderate and no noticeable feeling of variation in steering is present.

It will be apparent from a consideration of Figures 1 and 2 that continued rotation of the cam gear 15 beyond a point indicated at X on Figure 2 will cause an increase in ratio, at a relatively slow rate until the point Y is reached at which time the rate substantially increases again to the same maximum reached in the straight-ahead condition. For practical purposes, the amount of increase in ratio between the points X and Y is insufficient to negative its use in commercial vehicles. Accordingly, it is considered desirable to construct the steering to provide for lock-to-lock (extreme left to extreme right) steering wheel turn between opposite points Y. This action necessitates a slight increase in the projection of the teeth of cam rack 17 at opposite ends, as indicated at 17b and 17c. It will be understood, of course, that the change in ratio may be varied when utilizing the present invention by changing the contour of the cam 15. The particular arrangement illustrated is, however, quite satisfactory and approaches a round gear having its axis eccentric to the axis of the shaft 14.

In the illustration shown in Figure 3, a modified form of cam gear and cam rack is shown. As may there be seen, a rack 170 is connected to a tie rod actuating reciprocating element 180 and carries rack teeth 170a which co-operate with a cam gear 150 substantially identical to cam gear 15 above described. The back surface of the rack 170, indicated at 170b is provided with a humped shape and co-operates with an eccentrically mounted back-up roller 171. As the cam gear 150 is rotated and the cam rack 170 is permitted to move transversely of its axis of reciprocation, away from the rack 170 by reason in decrease of width of the rack. It will, of course, be recognized that the racks 170 must, accordingly, be provided with a connection at 180a which permits movement thereof in a direction transverse to the axis of reciprocation of the rod 180 without becoming disconnected from the element 180.

As in the case of all steering systems satisfactory to the purchasing public, it is imperative that systems herein described be adjustable to eliminate backlash. Accordingly, the back-up roller 171 is pivoted about an eccentric shaft to permit its adjustment toward and away from the gear 150, thereby urging the gear 170a into snug engagement with the teeth of the cam gear. In the embodiment shown in Figure 1, a wedge 35 is positioned between the housing 12 and the rack 17 and is adjustable by means of an adjusting nut 36 carried on screw 37 which is in turn threadedly secured to the supporting member 18 as at 38. Adjustment of the wedge 35 toward the right as viewed in Figure 1 will, of course, cause the teeth of the cam rack 17 to be snugly engaged with the teeth of the cam gear 15, thereby providing a non-lash system with substantially no lost motion.

Figure 5:
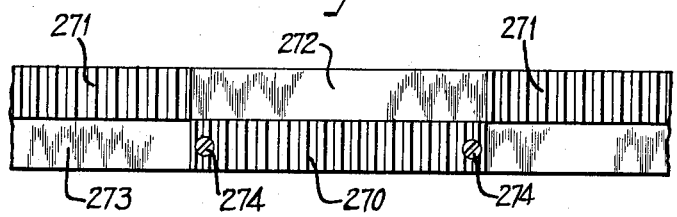
Figure 5 is a plan view of the variable ratio rack illustrated in Figure 4.
Figure 6:
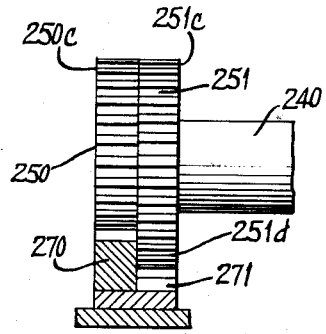
Figure 6 is a side elevational view taken along the line VI—VI of Figure 4 in partial cross-section.

As above discussed, and as illustrated in the embodiment of the invention shown in Figures 1 and 3, a steering structure is provided in which the effective number of turns of the steering wheel from lock-to-lock is limited to approximately one and one-half turns. Such a structure is very desirable in many automotive uses. In others, however, it has been found that a slightly less radical change from the steering systems presently employed in the industry is desired. An arrangement providing a steering wheel turn substantially in excess of one and one-half turns from lock-to-lock is illustrated in Figures 4, 5 and 6. In the embodiment of the invention there shown, the steering wheel 240 may rotate in either direction away from the neutral, straight-ahead, condition any number of turns required while at the same time a substantial ratio change is provided adjacent the in-line, straight-ahead condition without providing such a ratio change at the end of the steering wheel shaft movement. This is accomplished by means of a fragmental, staggered, rack and gear arrangement.

As shown in Figures 4, 5 and 6, the shaft 240 is provided with a cam gear 250 which may be substantially identical to the cam gear 15 and which has, as shown, a minimum radius point 250a in contact with rack 270 at portion 270a when the vehicle is in the neutral, straight-ahead condition. When considered in side elevation, as in Figure 6, the gear 250 and its co-operating rack fragment 270 are shown to be spaced axially of the shaft 240 relative to a second gear 251 and rack 271. As shown in Figure 5, the rack 271 is provided with a blank or inactive segment 272. Preferably, the structure is constructed by providing a straight rack 271 having an untoothed shoulder portion 273 and blank portion 272. The rack 270 is then secured to the shoulder 273 by screws 274 in the portion thereof facing the blank segment 272. In this way the rack 271 may be simply manufactured on conventional rack equipment and the only portion of the rack requiring special shaping apparatus is the portion 270 which may be modified at will and secured to the rack 271 to provide various ratio change configurations.

In operation, it will be apparent that rotation of the shaft 240 for one-half turn in either direction will provide co-operation between the cam gear 250 and rack portion 270. Upon rotation of the shaft 240 beyond the one-half turn, however, gear 250 will no longer mesh with any teeth on the rack 270 and, instead, gear 251 which has a constant diameter in the embodiment shown, engages with the rack portion 271 and further rotation of the shaft 240 causes force transfer solely between gear 251 and the rack 271.

It will, of course, be apparent that at the point of maximum radius 250c on the gear 250, the teeth on the gear 250 are at the same pitch circle as the teeth on the gear 251. This provides a smooth transition between contact between the racks 270 and 271. In the comments above, it was pointed out that the gear 251 is, in the embodiment shown, of constant diameter. As a result of this arrangement, it will be apparent that the rack portions 271 may extend longitudinally of the rack any distance desired and, accordingly, that any number of steering shaft turns may be provided between the extremes of left and right vehicle turn.

The form of the steering curve provided by the structure shown in Figures 4, 5 and 6 may be seen in the dotted line B of Figure 2. As there shown, instead of moving upwardly at the ends as curve A does at the points x, the curve B extends straight laterally to the extreme point of steering shaft movement. As above noted, and as illustrated in Figure 2, the specific configuration of the steering curve may be modified to provide a sharper change in ratio if desired by providing a more rapid increase in radius of the cam gear 15 or 250. Such a slight difference in ratio change is illustrated, for example, in the portion $B_1$ of the curve B in Figure 2.

As in the case of the embodiment shown in Figure 1, the embodiment shown in Figures 4, 5 and 6 may be revised to provide a rotary output member in co-operation with the gears 250 and 251, if desired. Such an arrangement is shown in Figures 7, 8 and 9. There, shaft 340, driven by a steering wheel, not shown, is provided with a cam gear 350 of variable radius and of substantially the same configuration as cam gears 15 and 250. Likewise, a gear 351 is provided of substantially constant radius and in axially spaced position relative to the gear 350 as shown in Figure 7. Gears 350 and 351 co-operate with a staggered gear generally indicated at 370. The gear 370 is provided with a portion of maximum radius 370a changing to a point of minimum radius at 370c. At the point 370c, the gear 370 changes to a different axial plane portion 371 in which the gear is of essentially constant radius. In the form shown, the gear 370 is approximately twice the effective diameter of the gears 350 and 351 providing a gear reduction.

In operation it will be seen that for the first 180° of rotation of the shaft 340 away from the straight-ahead condition illustrated in Figures 7 and 8, the cam gear 350 will be in contact with the portion 370a while beyond 180° of rotation of the shaft 340, the gear 351 will be in contact with the gear portion 371. It is of course clear that in the arrangement shown, the steering shaft 340 may be rotated 540° away from the straight-ahead position in either direction before any recurrence of ratio change is incurred. This results in a usable lock-to-lock steering range slightly in excess of three turns of the steering wheel. The form of the curve provided by the arrangement shown in Figures 7, 8 and 9 may, of course, be substantially identical to the form of the curve B shown in Figure 2.

In the embodiment shown in Figure 7, the shaft 375 is drivingly connected to an output gear 376 of substantially constant diameter and gear 376 is in turn drivingly associated with a reciprocable rack member 378 which may be substituted for the rack 17 of the power steering embodiment shown in Figure 1. As a result of the utilization of the intermediate gear 376, a further gear reduction may be provided and it will be appreciated that through the employment of the reducing aspects of gears 370 and 376, the variable ratio mechanism here illustrated may be employed as a manual system in some vehicles, for example, light weight racing vehicles.

In the embodiment shown in Figures 7, 8 and 9, the steering shaft 340 is mounted in bearing 380 which is in turn secured in a link 381 pivotally mounted about shaft 375 by bearing 382. No other bearing support is provided at the end of the shaft 340 carrying the gears 350 and 351 and accordingly upon the application of steering torques to the system, reaction will cause the shaft 340 to try to move peripherally of the gear 370. A slight peripheral movement is permitted by means of the pivotal supporting member 381 and this peripheral movement, which is reflected in an essentially transverse, though slightly arcuate, movement of the shaft 340, is employed as illustrated in Figure 9 for purposes of actuating a reciprocable spool valve 385. The spool valve 385 may be any conventional power steering valve of a reciprocable nature and preferably comprises a valve core reciprocated by link 386 movable in opposite directions from a midpoint to provide for the flow of fluid under pressure in to opposite chambers 28 and 29 of the power motor illustrated, for example, in Figure 1. Positive abutment stop 387 is provided preventing the link 381 from oscillation about its pivot shaft 375 for more than a few degrees of movement. This positive limitation limits transverse movement of the shaft 340 to a slight amount sufficient merely to actuate the valve 385, thereby providing a very slight amount of lost motion in the steering system before direct mechanical steering drive is achieved from the staft 340 to the output shaft 375.

In the systems shown, the full power of the power steering fluid motor is, of course, applied to steering even though the actual steering wheel to steered wheel ratio varies over a wide range. This is desirable since the actual torque at the steered wheels, and hence the actual torque is as high a value at the extremes of steering wheel movement as it is at the in-line or straight-ahead condition. This is desirable since maximum motor power is necessary at the extremes of steering wheel movement, in which positions the vehicle is ordinarily being parked at relatively slow vehicle speed.

It will accordingly be seen that I have provided a novel and superior power steering system for vehicles wherein a highly desirable variable ratio is provided in conjunction with an extremely simple mechanical construction. It will, of course, be apparent to those skilled in the art that variations and modifications, in addition to those above mentioned, may be made in the structure hereinabove described without departing from the scope of the novel concepts of the present invention. Accordingly, it is my intention that the scope of the present invention be limited solely by the scope of the hereinafter appended claims.

I claim as my invention:

1. In combination, a variable ratio steering gear for connecting a steering shaft member to a steering output member for steering association with dirigible vehicle wheels comprising, a first cam gear on said shaft member and a second cam gear on said output member, said first cam gear comprising a non-round symmetrical gear mounted on said shaft member for rotation therewith and having a point of reduced radius thereof in contact with said second cam gear in the straight-ahead position of said wheels, said first gear having an increasing radius as the periphery thereof extends away from said point, said second cam gear positively engaging said first cam gear and having a contour providing co-operative engagement therewith as said first cam gear rotates.

2. In combination, a variable ratio steering gear for connecting a steering shaft member to a steering output member for steering association with dirigible vehicle wheels comprising, a first cam gear on said shaft member and a second cam gear on said output member, said first cam gear comprising a non-round symmetrical gear mouted on said shaft member for rotation therewith and having a point of reduced radius thereof in contact with said second gam gear in the straight-ahead position of said wheels, said first gear having an increasing radius as the periphery thereof extends away from said point, said second cam gear comprising a cam rack for reciprocation by said first cam gear and having a toothed contour providing co-operative engagement with said first cam gear as said first cam gear rotates.

3. In combination, a variable ratio steering gear for connecting a steering shaft member to a steering output member for steering association with dirigible vehicle wheels comprising, a first cam gear on said shaft member and a second cam gear on said output member, said first cam gear comprising a non-round symmetrical gear mounted on said shaft member for rotation therewith and having a point of reduced radius thereof in contact with said second cam gear in the straight-ahead position of said wheels, said first gear having an increasing radius as the periphery thereof extends away from said point, said second cam gear positively engaging said first cam gear and having a contour providing co-operative engagement therewith as said first cam gear rotates, power boost means drivingly connected to said second cam gear for applying power thereto at a substantially constant ratio in response to the application of the predetermined steering torque requirement at the steering shaft member.

4. In combination, a variable ratio steering gear for connecting a steering shaft member to a steering output member for steering association with dirigible vehicle wheels comprising, a first cam gear on said shaft member and a second cam gear on said output member, said first cam gear comprising a non-round symmetrical gear mounted on said shaft member for rotation therewith and having a point of reduced radius thereof in contact with said second cam gear in the straight-ahead position of said wheels, said first gear having an increasing radius as the periphery thereof extends away from said point, said second cam gear positively engaging said first cam gear and having a contour providing co-operative engagement therewith as said first cam gear rotates, power boost means drivingly connected to said second cam gear for applying power thereto at a substantially constant ratio in response to the application of the predetermined steering torque requirement at the steering shaft member, said boost means having opposed pressure chambers for actuating said output member in opposite directions, hydraulic valve means associated with said shaft member and movable from a central fluid pressure blocking condition in the vehicle straight-ahead condition to direct fluid pressure to one of said chambers as said shaft member is rotated in either direction against a predetermined steering load.

5. A variable ratio power steering gear comprising a steering shaft member and a steering output member for association with dirigible vehicle wheels comprising a variable ratio connection between said members including first means providing a high ratio connection between said members when said members are in a neutral midpoint vehicle-straight-ahead relation, providing a substantially lower ratio at points of maximum movement of said steering output member away from said neutral relation, and providing a rapid rate of decrease in ratio adjacent said mid-point and a reducing rate of decrease in ratio as said output member moves away from said mid-point, power boost means positively connected to said out-put member to actuate said output member in response to steering loads above a predetermined minimum value as sensed at said steering shaft, control valve means moved in response to torque applied to said steering shaft before said variable ratio connection for controlling said power boost means, said power boost means being connected to said output member by a connection providing a substantially constant ratio of power boost to said output member independently of said variable ratio connection between said steering shaft member and steering output member.

6. A variable ratio power steering gear comprising a steering shaft member and a steering output member for association with dirigible vehicle wheels comprising a variable ratio connection between said members including first means providing a high ratio connection between said members when said members are in a neutral midpoint vehicle-straight-ahead relation, providing a substantially lower ratio at points of maximum movement of said steering output member away from said neutral relation, and providing a rapid rate of decrease in ratio adjacent said mid-point and a reducing rate of decrease in ratio as said output member moves away from said midpoint, power boost means positively connected to said output member to actuate said output member in response to steering loads above a predetermined minimum value as sensed at said steering shaft, control valve means moved in response to torque applied to said steering shaft before said variable ratio connection for controlling said power boost means, said power boost means being connected to said output member by a connection providing a substantially constant ratio of power boost to said output member independently of said variable ratio connection between said steering shaft member and steering output member, and means responsive to the force developed by said power boost means, and proportional thereto to resist movement of said shaft member.

7. In combination, a variable ratio steering gear for connecting a steering shaft member to a steering output member for steering association with dirigible vehicle wheels comprising, a first cam gear on said shaft member and a second cam gear on said output member, said first cam gear comprising a non-round symmetrical gear mounted on said shaft member for rotation therewith and having a point of reduced radius thereof in contact with said second cam gear in the straight-ahead position of said wheels, said first gear having an increasing radius as the periphery thereof extends away from said point, said second cam gear comprising a cam gear for reciprocation by said first cam gear and having a toothed contour providing co-operative engagement with said first cam gear as said first cam gear rotates, and adjustment means positioned on the side of said rack remote from said first cam gear for moving said rack transsversely of its axis of reciprocation into non-blacklash engagement with said first cam gear.

8. In combination, a variable ratio steering gear for connecting a steering shaft member to a steering output member for steering association with dirigible vehicle wheels comprising, a first cam gear on said shaft member and a second cam gear on said output member, said first cam gear comprising a non-round symmetrical gear mounted on said shaft member for rotation therewith and having a point of reduced radius thereof in contact with said second cam gear in the straight-ahead position of said wheels, said first gear having an increasing radius as the periphery thereof extends away from said point, said second cam gear positively engaging said first cam gear and comprising a cam rack having gear teeth thereon for co-operative engagement with said first cam gear, said cam rack having a configuration requiring constant engagement thereof with said first cam gear throughout the range of rotation of said first cam gear.

9. In combination, a variable ratio steering gear for connecting a steering shaft member to a steering output member for steering association with dirigible vehicle wheels comprising, a first cam gear on said shaft member and a second cam gear on said output member, said first cam gear comprising an eccentric non-round symmetrical gear mounted on said shaft member for rotation therewith and having a point of reduced radius thereof in contact with said second cam gear in the straight-ahead position of said wheels, said first gear having an increasing radius as the periphery thereof extends away from said point, said second cam gear positively engaging said first cam gear and having a contour providing co-operative engagement therewith as said first cam gear rotates.

10. In combination, a variable ratio steering gear for connecting a steering shaft member to a steering output member for steering association with dirigible vehicle wheels comprising, a first cam gear connected for rotation by said shaft member and a second cam gear on said output member, said first cam gear comprising an eccentric non-round symmetrical gear having a point of reduced radius thereof in contact with said second cam gear in the straight-ahead position of said wheels, said first gear having an increasing radius as the periphery thereof extends away from said point, said second cam gear positively engaging said first cam gear and comprising a cam rack having gear teeth thereon for cooperative engagement with said first cam gear, said cam rack having a configuration requiring constant engagement thereof with said first cam gear throughout the range of rotation of said first cam gear.

11. In combination, a variable ratio steering gear for connecting a steering shaft member to a steering output member for steering association with dirigible vehicle wheels comprising, a first cam gear on said shaft member and a second cam gear on said output member, said first cam gear comprising an eccentric non-round symmetrical gear mounted on said shaft member for rotation therewith and having a point of reduced radius thereof in contact with said second cam gear in the straight-ahead position of said wheels, said first gear having an increasing radius as the periphery thereof extends away from said point, said second cam gear positively engaging said first cam gear and having a contour providing co-operative engagement therewith as said first cam gear rotates through a predetermined degree of rotation, a third cam gear on said shaft member for rotation therewith, a fourth cam gear secured for movement with said second cam gear and said output member, said first and second cam gears transmitting drive between said shaft and output member up to said predetermined degree of rotation of said shaft member and said third and fourth cam gears co-operatively engaging each other and transmitting drive between said shaft and said output member upon rotation of said shaft beyond said predetermined degree of rotation.

12. In combination, a variable ratio steering gear for connecting a steering shaft member to a steering output member for steering association with dirigible vehicle wheels comprising, a first cam gear on said shaft member and a second cam gear on said output member, said first cam gear comprising an eccentric non-round symmetrical gear mounted on said shaft member for rotation therewith and having a point of reduced radius thereof in contact with said second cam gear in the straight-ahead position of said wheels, said first gear having an increasing radius as the periphery thereof extends away from said point, said second cam gear positively engaging said first cam gear and having a contour providing co-operative engagement therewith as said first cam gear rotates through 180° of rotation, a third cam gear on said shaft member for rotation with said first cam gear, a fourth cam gear secured to said output member for movement with said output member and said second cam gear, said third and fourth cam gears drivingly engaging each other for transmitting drive between said shaft and said output member upon rotation of said shaft member beyond said 180° of rotation.

13. In combination, a variable ratio steering gear for connecting a steering shaft member to a steering output member for steering association with dirigible vehicle wheels comprising, a first cam gear on said shaft member and a second cam gear on said output member, said first cam gear comprising an eccentric non-round symmetrical gear mounted on said shaft member for rotation therewith and having a point of reduced radius thereof in contact with said second cam gear in the straight-ahead position of said wheels, said first gear having an increasing radius as the periphery thereof extends away from said point, said second cam gear positively engaging said first cam gear and having a contour providing co-operative engagement therewith as said first cam gear rotates through a predetermined degree of rotation, a third cam gear on said shaft member for rotation with said first cam gear and said shaft member, a fourth cam gear secured for movement with said output member and said second cam gear, said third and fourth cam gears providing a substantially constant ratio drive transmission when in interengagement, said first and second cam gears transmitting drive between said shaft and output member up to said predetermined degree of rotation of said shaft and said third and fourth cam gears drivingly engaging each other for transmitting drive between said shaft and said output member upon rotation of said shaft to said predetermined degree of rotation and therebeyond.

14. In combination, a variable ratio steering gear for connecting a steering shaft member to a steering output member for steering association with dirigible vehicle wheels comprising, a first cam gear on said shaft member and a second cam gear on said output member, said first cam gear comprising an eccentric non-round symmetrical gear mounted on said shaft member for rotation therewith and having a point of reduced radius thereof in contact with said second cam gear in the straight-ahead position of said wheels and an increasing radius as the periphery thereof extends away from said point, said second cam gear positively engaging said first cam gear and having a contour providing co-operative engagement therewith as said first cam gear rotates through a predetermined degree of rotation, a third cam gear on said shaft member for rotation with said first cam gear and said shaft member, a fourth cam gear secured for movement with said output member and said second cam gear, said third cam gear comprising a gear having a radius substantially equal to the maximum radius of said first cam gear and rigidly secured thereto in a position axially spaced therefrom along said shaft, and said fourth cam gear likewise being axially spaced from said second cam gear for co-operation with said third cam gear, and means preventing driving engagement between said third and fourth cam gears through said predetermined degree of rotation of said shaft member.

15. In combination, a variable ratio steering gear for connecting a steering shaft member to a steering output member for steering association with dirigible vehicle wheels, comprising, a first cam gear on said shaft member and a second cam gear on said output member, said first cam gear comprising an eccentric non-round symmetrical gear mounted on said shaft member for rotation therewith and having a point of reduced radius thereof in contact with said second cam gear in the straight-ahead position of said wheels and an increasing radius as the periphery thereof extends away from said point, said second cam gear positively engaging said first cam gear and having a contour providing a co-operative engagement therewith as said first cam gear rotates, a third cam gear on said shaft member for rotation with said first cam gear and said shaft member, said third cam gear comprising a gear having a radius substantially equal to the maximum radius of said first cam gear and rigidly secured thereto in a position axially spaced therefrom along said shaft, a fourth cam gear segment secured to said second cam gear for movement therewith and with said output member, said fourth cam gear segment being axially spaced from said second cam gear for co-operation with said third cam gear, said fourth cam gear segment being positioned for co-operation with said third cam gear only after a predetermined degree of rotation of said shaft member.

16. In combination, a variable ratio steering gear for connecting a steering shaft member to a steering output member for steering association with dirigible vehicle wheels, comprising, a first cam gear on said shaft member and a second cam gear on said output member, said first cam gear comprising an eccentric non-round symmetrical gear mounted on said shaft member for rotation therewith and having a point of reduced radius thereof in contact with said second cam gear in the straight-ahead position of said wheels and an increasing radius as the periphery thereof extends away from said point, said second cam gear positively engaging said first cam gear and having a contour providing a co-operative engagement therewith as said first cam gear rotates, a third cam gear on said shaft member for rotation with said first cam gear and said shaft member, said third cam gear comprising a gear having a radius substantially equal to the maximum radius of said first cam gear and rigidly secured thereto in a position axially spaced therefrom along said shaft, a fourth cam gear segment secured to said second cam gear for movement therewith and with said output member, said fourth cam gear segment being axially spaced from said second cam gear for co-operation with said third cam gear, said fourth cam gear segment being positioned for co-operation with said third cam gear only after a predetermined degree of rotation of said shaft member, said second cam gear comprising a reciprocable rack member and said fourth cam gear segment comprising offset rack segments rigidly secured to said reciprocable rack.

17. In combination, a variable ratio steering gear for connecting a steering shaft member to a steering output member for steering association with dirigible vehicle wheels, comprising, a first cam gear on said shaft member, said first cam gear comprising an eccentric non-round symmetrical gear mounted on said shaft member for rotation therewith, a second cam gear on said output member and comprising a reciprocating rack having a contoured tooth configuration for co-operation with said first cam gear, said first cam gear having a point of reduced radius thereof in contact with said second cam gear in the straight-ahead position of said wheels, and having an increasing radius as the periphery of said first gear extends away from said point, said first and second cam gears positively intermeshing through 180° of rotation of said steering shaft in each direction away from the straight-ahead position, a third cam gear on said shaft member fixedly mounted for rotation with said first cam gear, said second cam gear having a pair of spaced offset rack tooth portions positioned for co-operation with said third cam gear only after rotation of said shaft member through approximately 180° of rotation thereof whereby steering movement of said shaft member provides a variable output of said second cam gear through a portion of the first rotation of said shaft member and a substantially constant movement of said second cam gear during continued rotation of said shaft member.

References Cited in the file of this patent

UNITED STATES PATENTS

| | | |
|---|---|---|
| 428,249 | Harfield | May 20, 1890 |
| 1,459,650 | Burnett | June 19, 1923 |
| 1,929,342 | Zeseiwitz | Oct. 3, 1933 |
| 2,485,792 | Van Voorhis | Oct. 25, 1949 |

FOREIGN PATENTS

| | | |
|---|---|---|
| 465,633 | France | Feb. 11, 1914 |
| 484,216 | Great Britain | May 3, 1938 |